J. M. ALLENWOOD.

Washing Apparatus for Hydraulic Mining.

No. 5,255. Reissued Jan. 28, 1873.

Witnesses.

Vincent Brown

Chas. Gorham.

Inventor.

Joseph M. Allenwood

AM. PHOTO-LITHOGRAPHIC CO. N.Y. (OSBORNE'S PROCESS.)

UNITED STATES PATENT OFFICE.

JOSEPH M. ALLENWOOD, OF TIMBUCTOO, CALIFORNIA, ASSIGNOR TO RANDOLPH R. CRAIG AND JOSEPH CRAIG.

IMPROVEMENT IN ORE-WASHING APPARATUS FOR HYDRAULIC MINING.

Specification forming part of Letters Patent No. 43,468, dated July 12, 1864; reissue No. 5,255, dated January 28, 1873.

*To all whom it may concern:*

Be it known that I, JOSEPH M. ALLENWOOD, of Timbuctoo, in Yuba county and State of California, have invented a new and Improved Method of Constructing the Apparatus for Hydraulic Operation in Mining, Washing Gold-Bearing Dirt, &c.; and I do hereby declare that the following is a full and exact description thereof, reference being had to the accompanying drawing and to the letters of reference marked thereon.

Figure 3:
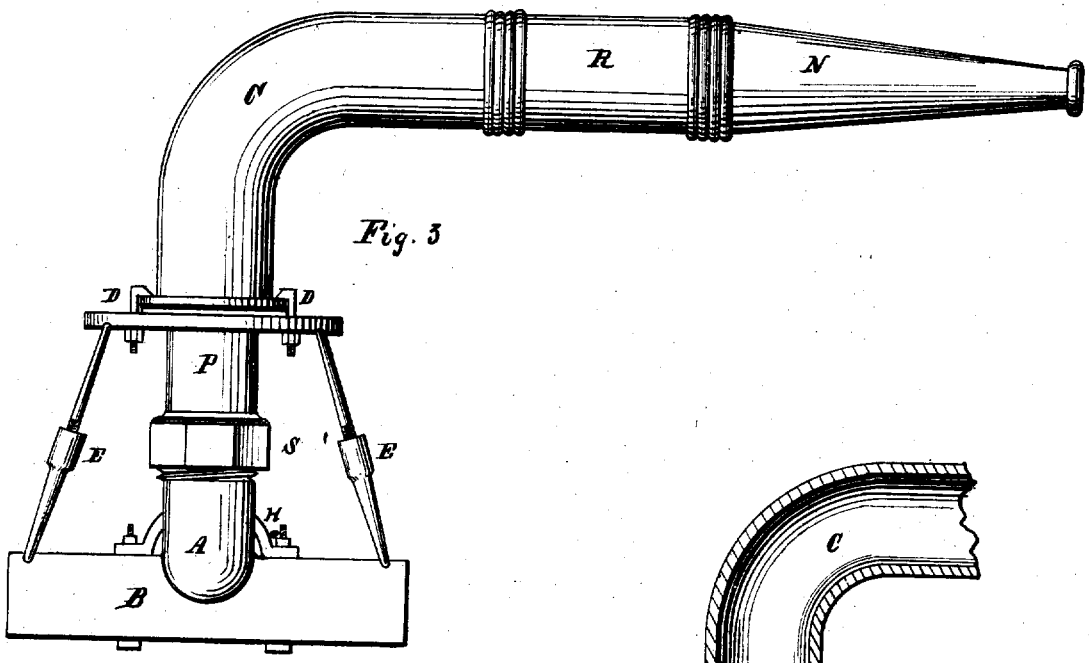
Figure 1:
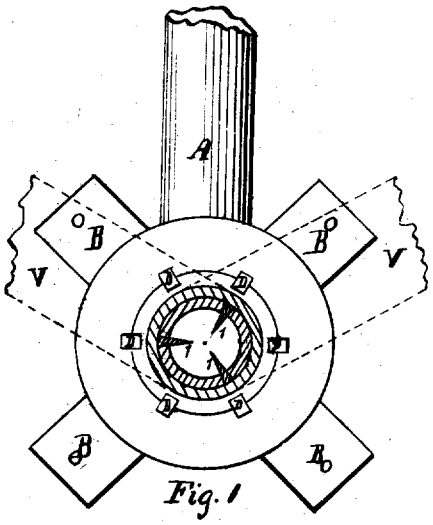
Figure 2:
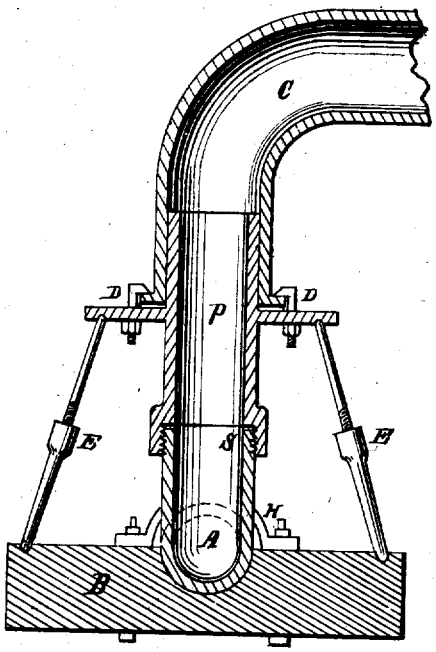

The nature of my invention consists in the novel combination of parts, as set forth in the accompanying drawing, where A, in elevation, section, and plan represents a main pipe leading to the reservoir, and conducting the water to the place of operation. At S, Fig. 3, is shown a screw for the purpose of detaching the upper portions at pleasure. C, in Fig. 3, is a pipe fitted over P, and upon which C revolves with a water-tight joint, and, being bent at right angles to P, can be turned to any desired point of the compass, section V V, plan Fig. 1, where D D D D D D represent hook-headed bolts for holding C in its place. (See D D, Fig. 2.) In plan Fig. 1, B B, are shown two foundation-sticks locked together at right angles for supporting the other parts of the apparatus, and to which they are attached by the fastening marked H in elevation and section. At E E, in Figs. 2 and 3, are shown four braces for adjusting the parts in a proper position. These braces are provided with a socket and screw whereby they can be shortened or lengthened at pleasure. At B, in Fig. 3, is shown a short piece of hose composed of some kind of flexible material, such as rubber or canvas, whereby the discharge-pipe N can be elevated or depressed so as to direct the discharge to any desired point. At 1 1 1, in plan Fig. 1, are shown (in red ink) three diaphragms or guides inserted in the pipe C, and near the hose R. These guides are for the purpose of directing the water in right lines when it is discharged, while in the same apparatus, without the guides, the water will be discharged in a spiral form, and the force of the water is neutralized and thrown in spray or fine particles. These guides cause the water to discharge in straight lines and in a solid stream to the place of operation—say one hundred feet from the point of discharge.

The same letters refer to the same parts throughout the whole system.

What I claim as my invention, and desire to secure by Letters Patent, is—

1. The combination of a discharge-pipe provided with guides or diaphragms, and the elbow C, connected by a working-joint with the supply-pipe A, substantially as and for the purposes above specified.

2. The combination of two elbows, C A, with the swiveling-joint D, substantially as and for the purposes above described.

3. The combination of the two working joints or couplings, D and R, with the discharge-pipe N and supply-pipe A, by means of which both the horizontal and vertical motions are obtained, substantially as and for the purposes specified.

4. The combination of the parts set forth in the accompanying specification, constituting a new and improved machine for the uses and purposes above described.

In witness whereof I have hereunto set my hand and seal.

JOSEPH M. ALLENWOOD. [L. S.]

Witnesses:
G. B. HORNISH,
C. F. LUENS.